UNITED STATES PATENT OFFICE.

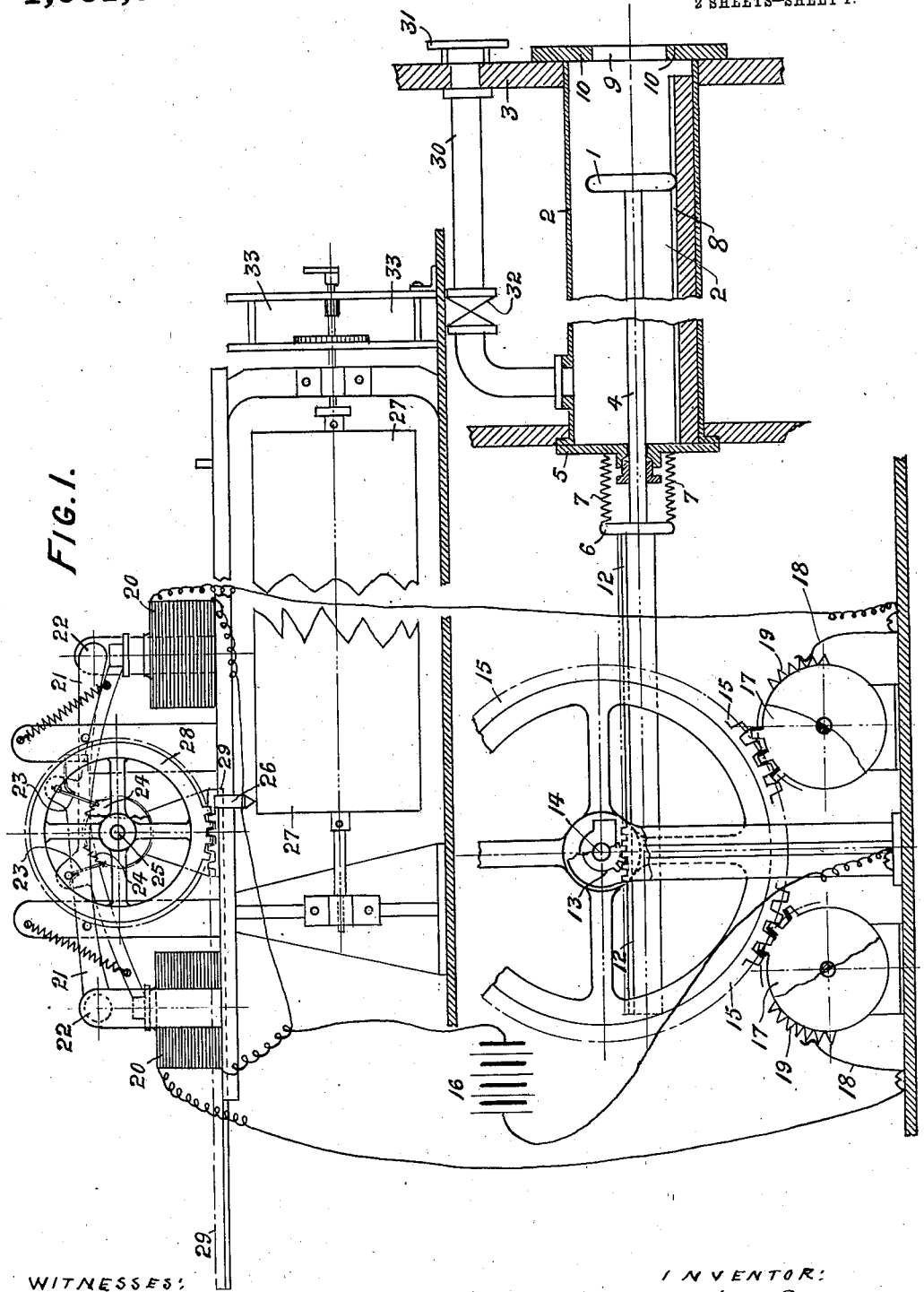

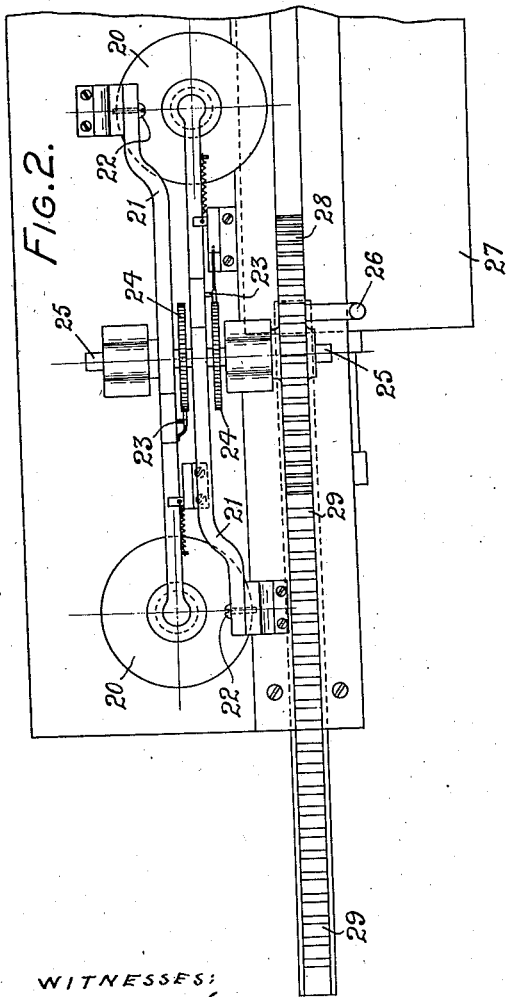
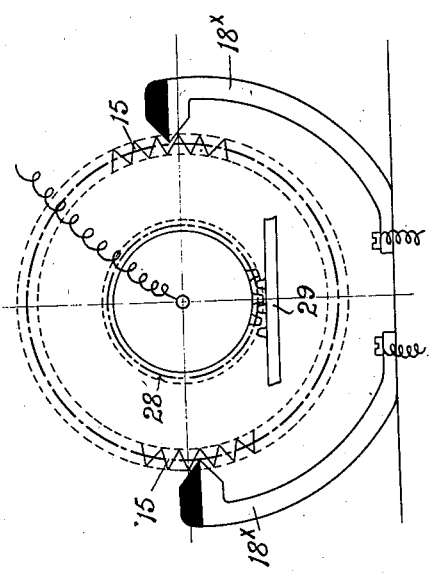

ALFRED JOPLING COOPER, OF TOTLAND BAY, ISLE OF WIGHT, ENGLAND.

APPARATUS FOR INDICATING AND RECORDING THE SPEED OF SHIPS.

1,061,985.  Specification of Letters Patent.  Patented May 20, 1913.

Application filed May 11, 1912. Serial No. 696,561.

*To all whom it may concern:*

Be it known that I, ALFRED JOPLING COOPER, a subject of the King of England, residing at Totland Bay, in the Isle of Wight, England, have invented certain new and useful Improvements in or Connected with Apparatus for Indicating and Recording the Speed of Ships, of which the following is a specification.

This invention has reference to apparatus or instruments for indicating at every moment the rate of speed at which a ship is sailing, or being propelled, and of obtaining a permanent record or log of the different speeds acquired on a voyage by a ship, and the times at which any and all speeds existed; and it relates more particularly to such apparatus wherein a spring controlled movable plate or device is employed, for operating a registering means whereby the differences of the reacting forces of the water on the plate are registered; and the primary object of the invention is to provide an apparatus of this kind which is relatively durable; is or may be constant in action; is simple, and not liable easily to get out of order; and is generally well fitted to the purposes for which it is intended.

In speed indicating or recording apparatus under this invention, the horizontal pressure of water against a plain surface or body, which is moving through it in a horizontal direction, is utilized as the active force for effecting the indication or recording. In the apparatus, a piston, disposed and working in a cylinder, is employed as the surface or body moved through the water; and it is placed in such a way generally in or near the bows of, and within the hull of the ship or vessel, that the horizontal pressure of the water actuating the piston is not disturbed or effected by the pitch or rolling of the vessel, or by other causes such as hydrostatic pressure. The piston is movable backward and forward in the line of direction of movement of the ship, and works in connection with a spring or like resistance, and a gage or indicator, so that when this resistance is compressed or put under strain, a certain distance or a certain degree, the speed at which the piston—and the ship—is passing through the water, or forced against it, is shown on the gage or indicator in knots per hour, or other rate.

The invention will be further described in connection with the accompanying drawings which show one arrangement of apparatus adapted to act according to it.

In this drawing, Figure 1 is an elevation showing the several parts of the apparatus; and Fig. 2 is a plan of the portion of it shown in the upper part of Fig. 1. Fig. 3 is an illustration of a modification hereinafter referred to.

Referring to the drawings, 1 is a piston which is acted upon by the water, it being placed in a cylinder 2, disposed say in the bow or other convenient part, and within the skin of the ship, of which 3 represents the stem or plate, as the case may be. It is placed well below the level of the water, so as to be always immersed when the ship is pitching or rolling. The piston 1 is fixed on the end of the piston rod 4, which projects through the inner end 5 of the cylinder 2, and has a cross head 6 on it, which is connected to the cylinder end 5 by springs 7, against which the piston in action is pressed, and which tend to move the piston back again in the direction of travel of the ship. The piston rests and slides on a guide 8. It will be noted that the cylinder 2 is substantially larger than the piston 1, so that the water has free access around and behind the piston 1, which balances the force and makes the piston a differential measurer of horizontal pressures. The hydrostatic pressure due to depth acts on both sides of the piston, and is therefore nullified. This effect is especially serviceable in overcoming the complications of pressure in connection with apparatus of this kind, due to the varying drafts of water of the ship, on account of pitching and differences of loading.

Around the entrance aperture 9 on the front end of the cylinder 2, is a ring 10, and the water is directed horizontally on to the piston by this ring, the entrance aperture 9 being preferably of about the same diameter as the piston. By the use of the ring 10, or its equivalent, in front of the piston face 1, it is protected from all pressures excepting the horizontal pressure due to the ship's speed, and to the depth of immersion.

With regard to the recording apparatus, in the case shown, this may be assumed to be on the bridge of the vessel, or in some other place away from the piston or actuating portion of the apparatus. In this case, between the piston apparatus and the recording apparatus, there is an intermediate circuit making and breaking mechanism for operating electro-magnets, or solenoids, in the recording mechanism proper. This mechanism consists of a toothed rack 12 attached to the end of the piston rod 4, and working on a pinion 13, fixed on a spindle 14, carrying a large toothed wheel 15, which serves as a contact making wheel, to which current is supplied by a suitable source of electricity, 16, and which operates in connection with other toothed contact wheels 17, respectively connected by circuit wires with the electromagnets 20 of the recording mechanism. The teeth of the wheel 17 are provided on one side with insulating material, as shown by the darkened parts, the rest of the wheel being metal; while the teeth of the wheel 15 are spaced widely apart so that when they are in contact with one side of the teeth of a wheel 17, they are out of contact with the other side; that is, when the wheel 15 is moved in one direction by the action of the water and the piston 1, its teeth will be in contact with the insulation of the teeth of the right hand wheel 17 so that no circuit or current can flow through this wheel to the right hand electro-magnet 20; while the teeth which are working in contact with the left hand wheel 17 will be acting upon the metallic portion of these teeth, and so a circuit is made between the source of current supply, 16, and the left hand electro-magnet, and that solenoid will be actuated. Spring contact arms 18 act in connection with teeth of star wheels 19 on disks or the like, on the spindle of the wheels 17, and hold these wheels 17 in certain positions in relation to the teeth of the wheel 15, so that the contacts required are accomplished. The effect of the circuits made and broken as described, is that the magnets 20 acting upon armatures on the end of levers 21, hinged at 22, see Fig. 2 are pulled down when the current is passed through the coil of one or the other magnets, and this movement through pawls 23, and right and left hand ratchet wheels 24, fixed on the spindle 25, rotates this spindle in one or other direction, accordingly as the piston 1 is moved in by the pressure of the water, or outward by the springs 7; and this transmits motion to a style or pen 26, operating upon a sheet of paper or the like on the driving drum 27, through a spur wheel 28, operating on a slidable toothed rack 29, carrying this style 26; so that as the wheel 28 is revolved in one or other direction, the style or pen 26 will be moved longitudinally, forward and backward and will thus mark and record on the paper on the drum 27, the variations of speed of the ship. The drum 27 is driven at a uniform rate by a time keeping spring motor 33 which rotates its spindle. By using a scale on the sheet, it will indicate the speed of the vessel at every instant of time.

The speed may be also adapted to be indicated by a pointer, in addition to the recording mechanism, or dial.

A relief pipe 30 is provided on the cylinder 2, behind the piston 1, by which the water behind the piston, or some of it, when it is moved back by the piston, due to the pressure on the face of it, can be forced out of the cylinder. The discharge mouth of the pipe 30 has over it a shield 31, which directs the water discharged at right angles, and prevents the resistance of the sea so acting upon it, to prevent its discharge. When directed toward the bow of the ship, this outlet or discharge end of the pipe 30 must be above the principal opening 9, in order to provide a free relief; but in some cases this pipe 30 might be taken up above the water sea level on the ship, in which case, it would of course require no shield or protector device; and the water would then be allowed to overflow, but this flow is not used as a measurer of speed; also the relief pipe may be led out at the ship's side.

A valve 32 may be provided on the pipe 30 for shutting off water, if necessary; and by constricting the area of the pipe 30, the action of the apparatus can be retarded or regulated, so that plunging or diving effects may be obviated. Conversely, when the speed decreases, and the pressure on the piston 1 is diminished, and is moved outward by the springs 7, the pipe 30 serves to feed water to the cylinder 2 behind the piston.

A slightly modified arrangement of the intermediate mechanism is shown in Fig. 3. In this case, the wheel 15 has simply V-shaped teeth, and the contact spring arms $18^x$, the V-shaped ends of which operate in connection with it, have at these ends, metal on one side, and insulation on the other, the latter being on the top, as shown by the dark portion. The V-shaped ends, and wheel, are so arranged that when the wheel is turned in one direction, the teeth will act on the metallic portion of the V-end of one spring contact arm $18^x$, and on the insulation of the other; and the circuit wires being connected with these spring arms, as in connection with the spring arms 18 in Fig. 1, the circuits of the different electro-magnets will be controlled and supplied, as in this case. The V-ends of the contact springs 18 are not diametrically opposite in relation to the axis of the wheel 15; that is they are unequal say, by half a tooth distance. This makes certain that, if the wheel 15 advances, say 20 teeth—which equals say 5 knots—and then slacks back a tooth, the ¼ knot will be deducted on the recorder; otherwise the knots advance will be recorded as 5¼ knots, in place of 5 knots from 4¾.

As regards the use of the invention in case of ships of slow speed, say up to 12 knots, or those not requiring a daily record, like coasters, the electrical recording mechanism may be dispensed with, and the speed or movement of the piston rack 12 may be simply connected by simple toothed gear and beveled wheels or other gear, to an indicator pointer or the like, which would be arranged to indicate on a scale or on a dial, at a convenient place the speed of knots, corresponding with the different positions of the piston.

What is claimed is:—

1. In apparatus for indicating or recording the speed of ships, a tube or cylinder placed within the skin of the ship, and in free communication at one end with the water; a piston arranged within the tube, and movable longitudinally therein, and arranged and adapted to cause the resistant pressure on the water due to speed or horizontal movement to act on the face of same, and the diameter of which is substantially less than that of the cylinder; an indicator; and means operated by the piston for operating the indicator; substantially as set forth.

2. In apparatus for indicating or recording the speed of ships, the combination of a piston, a tube or cylinder of larger diameter than the piston, and having a regulated aperture in its forward end, for directing the pressure of water on the piston; springs adapted to move the piston in the opposite direction to the water; an indicator; and means operated by the piston for operating the indicator; substantially as described.

3. In apparatus for indicating or recording the speed of ships, the combination of a piston, a tube or cylinder of larger diameter than the piston and open at one end to receive the pressure of the water, a spring or springs adapted to move the piston in the opposite direction to the water; a relief pipe at the after end of the cylinder to allow water behind the piston to escape; an indicator; and means operated by the piston for operating the indicator; substantially as set forth.

4. In apparatus for indicating or recording the speed of ships, a tube or cylinder placed within the skin of the ship, and in free communication at one end with the water; and a piston arranged within the tube, and movable longitudinally therein, and arranged and adapted to cause the resistant pressure on the water due to speed or horizontal movement to act on the face of same, and the diameter of which is substantially less than that of the cylinder; an electrically toothed wheel contact making and breaking mechanism, wherein the teeth of the different contact wheels are insulated at one side, and oppositely, in the two sets, and recording or indicating mechanism operated by the electrical mechanism in the one direction, or the other; substantially as described.

In testimony whereof I have signed my name to this specification in the presence of two subscribing witnesses.

ALFRED JOPLING COOPER.

Witnesses:
HARVEY J. BOWERSTOCK,
CHARLES PACK.